(12) United States Patent
Esaki et al.

(10) Patent No.: US 11,537,692 B2
(45) Date of Patent: Dec. 27, 2022

(54) PERSONAL IDENTIFICATION APPARATUS AND PERSONAL IDENTIFICATION METHOD

(71) Applicant: HONDA MOTOR CO., LTD., Tokyo (JP)

(72) Inventors: Hisumi Esaki, Wako (JP); Kota Saito, Wako (JP); Seungho Choi, Wako (JP); Yoshikazu Matsuo, Wako (JP); Naoki Kikuchi, Wako (JP); Weifeng Zhang, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 674 days.

(21) Appl. No.: 16/533,007

(22) Filed: Aug. 6, 2019

(65) Prior Publication Data
US 2020/0050742 A1    Feb. 13, 2020

(30) Foreign Application Priority Data

Aug. 10, 2018 (JP) .............................. JP2018-150964

(51) Int. Cl.
| | | |
|---|---|---|
| *G06F 21/00* | (2013.01) | |
| *G06F 21/31* | (2013.01) | |
| *G10L 17/06* | (2013.01) | |
| *G10L 17/00* | (2013.01) | |

(52) U.S. Cl.
CPC .............. *G06F 21/31* (2013.01); *G10L 17/00* (2013.01); *G10L 17/06* (2013.01)

(58) Field of Classification Search
CPC ......... G06F 21/31; G10L 17/00; G10L 17/06; G01C 21/00; G06V 20/59; G06V 40/70
See application file for complete search history.

(56) References Cited

U.S. PATENT DOCUMENTS

2009/0289780 A1* 11/2009 Tenorio-Fox ........... B60R 25/04
                                                        280/727
2014/0195477 A1*  7/2014 Graumann ............ B60W 40/08
                                                        707/737
(Continued)

FOREIGN PATENT DOCUMENTS

| JP | 2004-213175 A | 7/2004 |
|---|---|---|
| JP | 2008-032569 A | 2/2008 |

(Continued)

OTHER PUBLICATIONS

Office Action dated Sep. 28, 2021 issued over the corresponding Japanese Patent Application No. 2018-150964 with the English translation thereof.

*Primary Examiner* — Brandon Hoffman
*Assistant Examiner* — William A Corum, Jr.
(74) *Attorney, Agent, or Firm* — Carrier Blackman & Associates, P.C.; Joseph P. Carrier; Fulchand P. Shende

(57) ABSTRACT

A personal identification apparatus includes a recording unit that records in advance feature information concerning an activity of at least one of a first person (person A) and a second person (person B or C) when the first person and the second person are together; an information acquiring unit that acquires identification information for identifying the other person; and an identification processing unit that identifies the other person as the second person, based on matching between the identification information and the feature information.

17 Claims, 9 Drawing Sheets

(56) References Cited

U.S. PATENT DOCUMENTS

| | | | | |
|---|---|---|---|---|
| 2014/0200737 A1* | 7/2014 | Lortz | .................... | H04L 63/102 |
| | | | | 701/1 |
| 2014/0303899 A1* | 10/2014 | Fung | ................. | G06K 9/00536 |
| | | | | 702/19 |
| 2015/0194155 A1* | 7/2015 | Tsujikawa | .......... | H04N 21/4532 |
| | | | | 704/246 |
| 2017/0313248 A1* | 11/2017 | Kothari | ..................... | B60R 1/00 |
| 2018/0086307 A1* | 3/2018 | Spina | ........................ | G06T 7/11 |
| 2019/0259044 A1* | 8/2019 | Kawashima | ............ | G07C 5/008 |
| 2020/0062265 A1* | 2/2020 | Wunderlich | ............ | G10L 15/22 |
| 2021/0006933 A1* | 1/2021 | Dean | ....................... | G16Y 40/10 |
| 2021/0031630 A1* | 2/2021 | Brunbäck | ............. | B60W 40/08 |
| 2021/0179117 A1* | 6/2021 | Glazman | ................. | H04S 7/303 |

FOREIGN PATENT DOCUMENTS

| | | | |
|---|---|---|---|
| JP | 2008-059509 | A | 3/2008 |
| JP | 2010-190745 | A | 9/2010 |
| JP | 2010-217318 | A | 9/2010 |
| JP | 2017-045252 | A | 3/2017 |

\* cited by examiner

FIG. 2

| NAME (OR ID) | FACE IMAGE | IRIS | VOICE PRINT | CONTACT INFORMATION | DATE OF BIRTH |
|---|---|---|---|---|---|
| AAAA (PERSON A) | | | | XXXXXX | Y1/M1/D1 |
| BBBB (PERSON B) | | | | YYYYYY | Y2/M2/D2 |
| CCCC (PERSON C) | | | | XXXXXX YYYYYY | Y3/M3/D3 |

FIG. 3

| NAME (OR ID) OF FIRST PERSON | NAME (OR ID) OF SECOND PERSON | RELATIONSHIP |
|---|---|---|
| AAAA (PERSON A) | BBBB (PERSON B) | WIFE |
| | CCCC (PERSON C) | CHILD |

30

| RECORDED TIME INFORMATION | RECORDED LOCATION INFORMATION | RECORDED OUTGOING NAME CALLING INFORMATION | RECORDED INCOMING NAME CALLING INFORMATION | RECORDED ACTION INFORMATION |
|---|---|---|---|---|
| SATURDAY AND SUNDAY, 2 p.m. TO 5 p.m. | SUPERMARKET | BB | AA | TOUCHING HAIR |
| MONDAY TO FRIDAY, 7 a.m. TO 8 a.m. | PRESCHOOL | CC | PAPA | MOVING LEGS |

34a 34b 34c 34d 34e

34

32
32

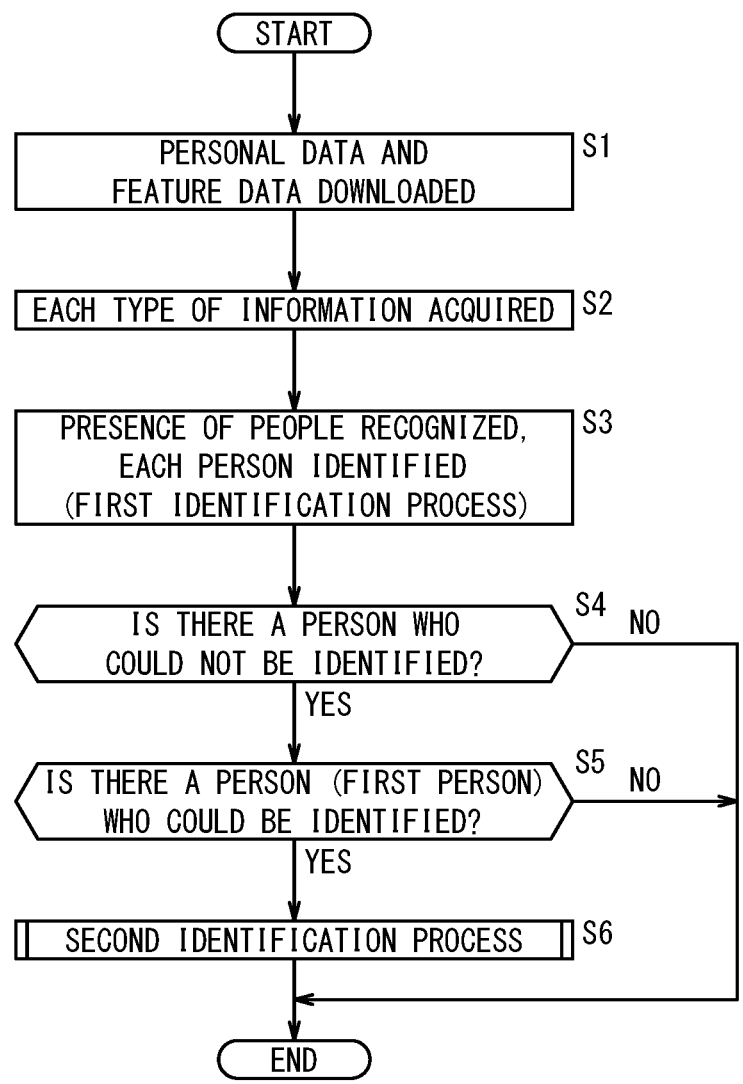

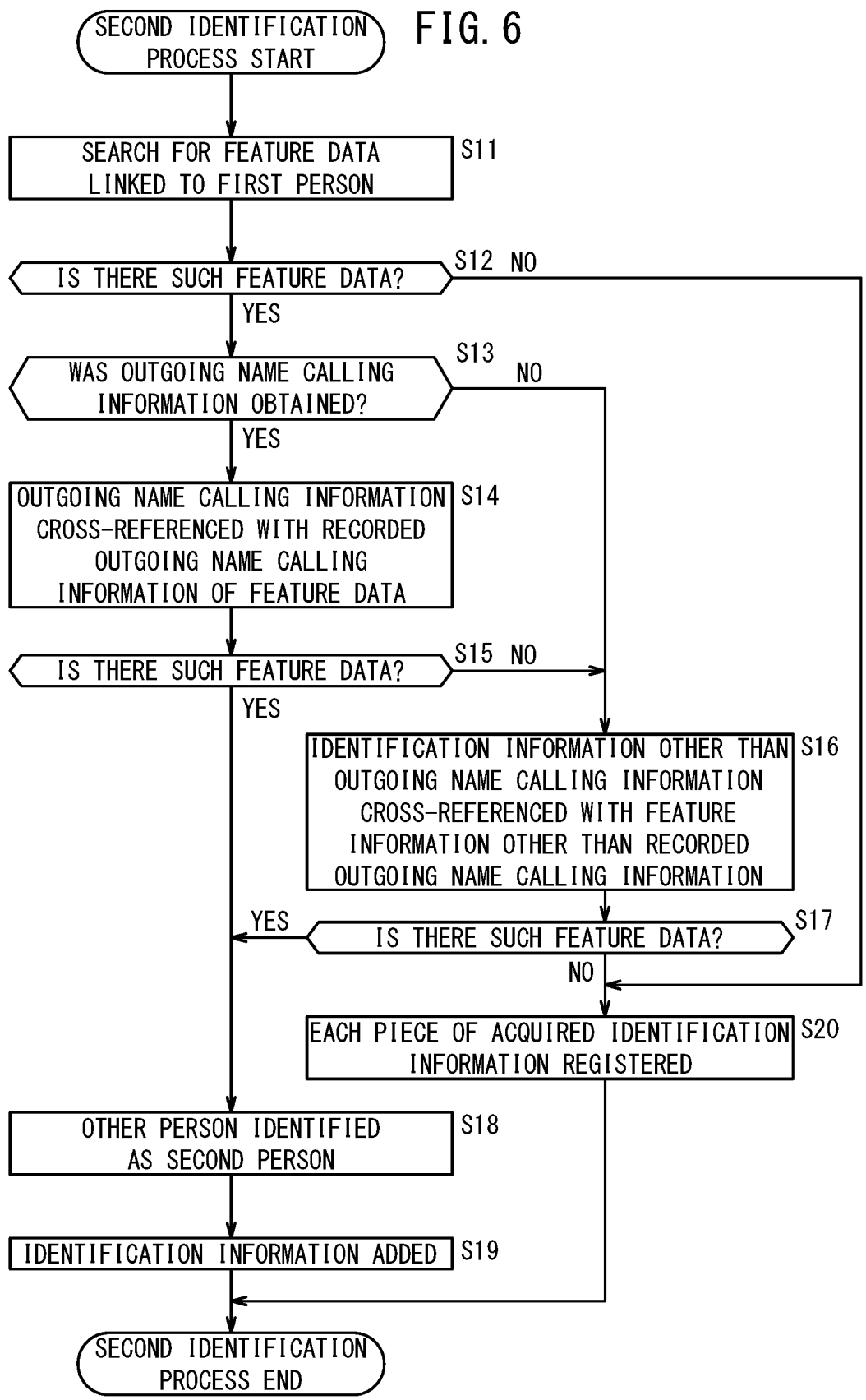

| NAME (OR ID) OF FIRST PERSON | NAME (OR ID) OF PERSON | RELATIONSHIP |
|---|---|---|
| AAAA (PERSON A) | BBBB (PERSON B) | WIFE |
| | CCCC (PERSON C) | CHILD |

| | 34a | 34b | 34c | 34d | 34e |
|---|---|---|---|---|---|
| RECORDED TIME INFORMATION | RECORDED LOCATION INFORMATION | RECORDED OUTGOING NAME CALLING INFORMATION | RECORDED INCOMING NAME CALLING INFORMATION | RECORDED ACTION INFORMATION |
| SATURDAY AND SUNDAY, 2 p.m. TO 5 p.m. | SUPERMARKET | BB | AA | TOUCHING HAIR |
| | RESTAURANT | | | |
| MONDAY TO FRIDAY, 7 a.m. TO 8 a.m. | PRESCHOOL | CC | PAPA | MOVING LEGS |

| NAME (OR ID) OF FIRST PERSON | NAME (OR ID) OF PERSON | RELATIONSHIP |
|---|---|---|
| AAAA (PERSON A) | BBBB (PERSON B) | WIFE |
| | CCCC (PERSON C) | CHILD |
| | – | – |

30

34

| RECORDED TIME INFORMATION 34a | RECORDED LOCATION INFORMATION 34b | RECORDED OUTGOING NAME CALLING INFORMATION 34c | RECORDED INCOMING NAME CALLING INFORMATION 34d | RECORDED ACTION INFORMATION 34e |
|---|---|---|---|---|
| SATURDAY AND SUNDAY, 2 p.m. TO 5 p.m. | SUPERMARKET | BB | AA | TOUCHING HAIR |
| MONDAY TO FRIDAY, 7 a.m. TO 8 a.m. | PRESCHOOL | CC | PAPA | MOVING LEGS |
| TUESDAY, 7 p.m. | RESTAURANT | – | AA | – |

32
32
32a

PERSONAL IDENTIFICATION APPARATUS AND PERSONAL IDENTIFICATION METHOD

CROSS-REFERENCE TO RELATED APPLICATION

This application is based upon and claims the benefit of priority from Japanese Patent Application No. 2018-150964 filed on Aug. 10, 2018, the contents of which are incorporated herein by reference.

BACKGROUND OF THE INVENTION

Field of the Invention

The present invention relates to a personal identification apparatus and a personal identification method for identifying a first person and then identifying another person other than the first person.

Description of the Related Art

Japanese Laid-Open Patent Publication No 2008-059509 discloses a personal identification system used to authenticate the user of a vehicle. In this user identification system, each vehicle has an authentication terminal mounted therein. The authentication terminal judges whether the person being identified is a registered person, based on iris data.

SUMMARY OF THE INVENTION

According to the personal identification system shown in Japanese Laid-Open Patent Publication No 2008-059509, the iris data of a person is registered in advance, and it is possible to identify a person when a camera acquires the iris data of the person. In contrast, it is impossible to identify a person if the iris data of this person is not registered or if the camera cannot acquire the iris data of this person.

The present invention aims to solve the above problem, and it is an object of the present invention to provide a personal identification apparatus and a personal identification method making it possible to easily identify who a person is.

A first aspect of the present invention is a personal identification apparatus that identifies a first person and then identifies another person other than the first person, comprising a recording unit that records in advance feature information concerning an activity performed by at least one of the first person and a second person, when the first person and the second person are together; an information acquiring unit that acquires identification information for identifying the other person; and an identification processing unit that identifies the other person as the second person, based on matching between the identification information and the feature information.

A second aspect of the present invention is a personal identification method for identifying a first person and then identifying another person other than the first person, comprising recording in advance, in a recording unit, feature information concerning an activity performed by at least one of the first person and a second person, when the first person and the second person are together; acquiring, with an information acquiring unit, identification information for identifying the other person; and identifying, with an identification processing unit, the other person as the second person, based on matching between the identification information and the feature information.

According to the present embodiment, it is possible to identify the other person who is together with the first person as the second person, by identifying the first person. Furthermore, it is possible to identify the other person with a simple method if the first person can be identified, and therefore the load of the identification process is reduced.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 2 is a configurational diagram of each piece of identification data.

FIG. 3 is a configurational diagram of related person information.

FIG. 5 is a flow chart of the main process performed by the personal identification apparatus.

FIG. 6 is a flow chart of the second identification process performed by the personal identification apparatus.

FIG. 7 is a configurational diagram of related person information to which the destination information has been added.

FIG. 8 is a configurational diagram of related person information to which the new feature information has been added.

DESCRIPTION OF THE PREFERRED EMBODIMENTS

The following describes examples of preferred embodiments of the personal identification apparatus and the personal identification method according to the present invention, while referencing the accompanying drawings.

[1. Configuration of the Personal Identification System 10]

Figure 1:
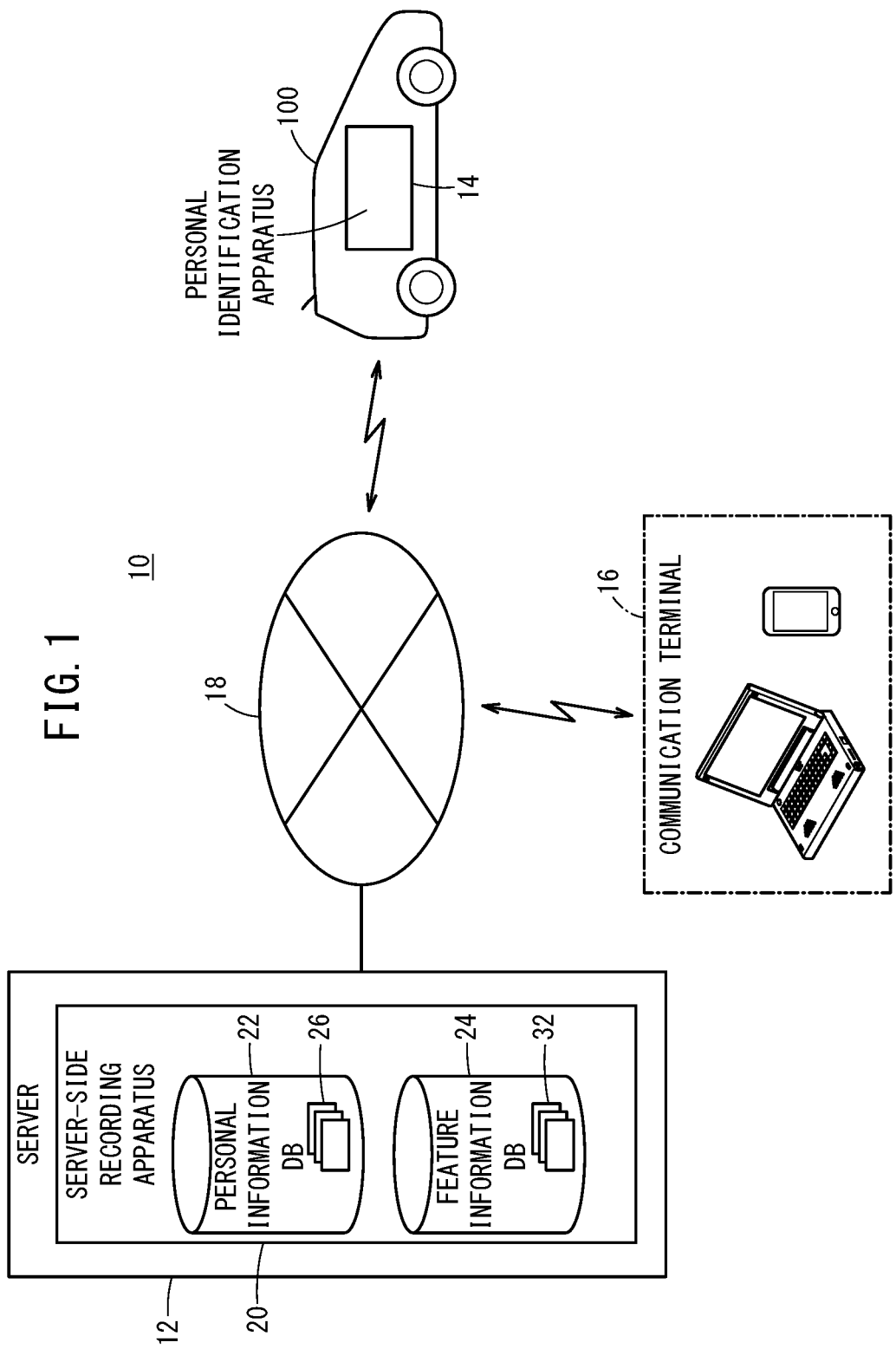
FIG. 1 is a configurational diagram of the personal identification system.

The configuration of a personal identification system 10 is described using FIG. 1. The personal identification system 10 includes a server 12, a personal identification apparatus 14, and a communication terminal 16. The server 12 and the personal identification apparatus 14, as well as the personal identification apparatus 14 and the communication terminal 16, are capable of performing data communication with each other via a communication line 18 including a public network. The personal identification apparatus 14 according to the present embodiment is provided in a vehicle 100. The configuration of the vehicle 100 is described below in section [2].

The server 12 is installed in a server room of a business operator that provides the personal identification service. The server 12 transmits information recorded in a server-side recording apparatus 20 to the personal identification apparatus 14, and receives information transmitted by the personal identification apparatus 14. The server-side recording apparatus 20 includes a personal information database 22 (referred to below as the personal information DB 22)

and a feature information database 24 (referred to below as the feature information DB 24).

The personal information DB 22 records personal data 26, such as shown in FIG. 2, for each person that is a user of the vehicle 100. FIG. 2 shows personal data 26 of person A and person B, who are a married couple, and personal data 26 of person C, who is a child of this couple. The personal data 26 includes the names (or ID numbers), biometric information 28, contact information, dates of birth, and the like of the people A, B, and C. The biometric information 28 is information for identifying the people A, B, and C inside the car, and includes information such as face images, iris images, voice prints, and the like. As shown in FIG. 2, the contact information may be information such as an e-mail address, phone number, or the like of a communication terminal 16 possessed by these people, or may be information such as an e-mail address, phone number, or the like of a communication terminal 16 possessed by a related person (e.g. the people A and B who are the parents, in the case of person C) who has some relation to these people. The personal data 26 is registered in the personal information DB 22 at an arbitrary timing, e.g. the timing at which the vehicle 100 is purchased.

The feature information DB 24 registers related person information 30, such as shown in FIG. 3, for every person whose personal data 26 is registered in the personal information DB 22. The related person information 30 is formed by feature data 32 of one or more people having a relationship with the people whose personal data 26 is registered. FIG. 3 shows the feature data 32 of related people (the person B who is the wife of the person A and the person C who is the child of the person A) who are related to person A. This feature data 32 includes the names (or ID numbers) of the people B and C, information indicating the relationships that the people B and C have to the person A, feature information 34, and the like. The feature information 34 is information for identifying the people B and C together with the person A, without using personal information, and includes recorded time information 34a, recorded location information 34b, recorded outgoing name calling information 34c, recorded incoming name calling information 34d, recorded action information 34e, and the like, for example. The recorded time information 34a is recorded as a timing or time span during which the person A performs an activity together with the people B and C. The recorded location information 34b is recorded as a location where the person A is performing the activity together with the people B and C. The recorded outgoing name calling information 34c is recorded as names by which the person A calls the people B and C. The recorded incoming name calling information 34d is recorded as names by which the people B and C call person A. The recorded action information 34e is recorded as actions of the people B and C made when performing the activity together with the person A. The feature data 32 of the people B and C is linked to the personal information (ID number and the like) of the person A. The feature data 32 can be registered in the feature information DB 24 at any timing, e.g. the timing at which the vehicle 100 is purchased, and can also be registered in the feature information DB 24 the people B and C ride in the vehicle 100 together with the person A, as described further below.

The communication terminal 16 shown in FIG. 1 is a terminal apparatus that can be connected wirelessly or in a wired manner to the communication line 18, and is a personal computer, smartphone, mobile telephone, or the like, for example.

[2. Configuration of the Vehicle 100]

The vehicle 100 includes at least one of an engine and an electric motor as a drive source. Furthermore, manipulation of the vehicle 100 including all of the driving, braking, and steering may be performed by a driver, or at least one of the manipulations of driving, braking, and steering may be performed by a vehicle system. The vehicle 100 may be owned by an individual, or may be owned by a business operator such as a rental car business or a car sharing business.

Figure 4:
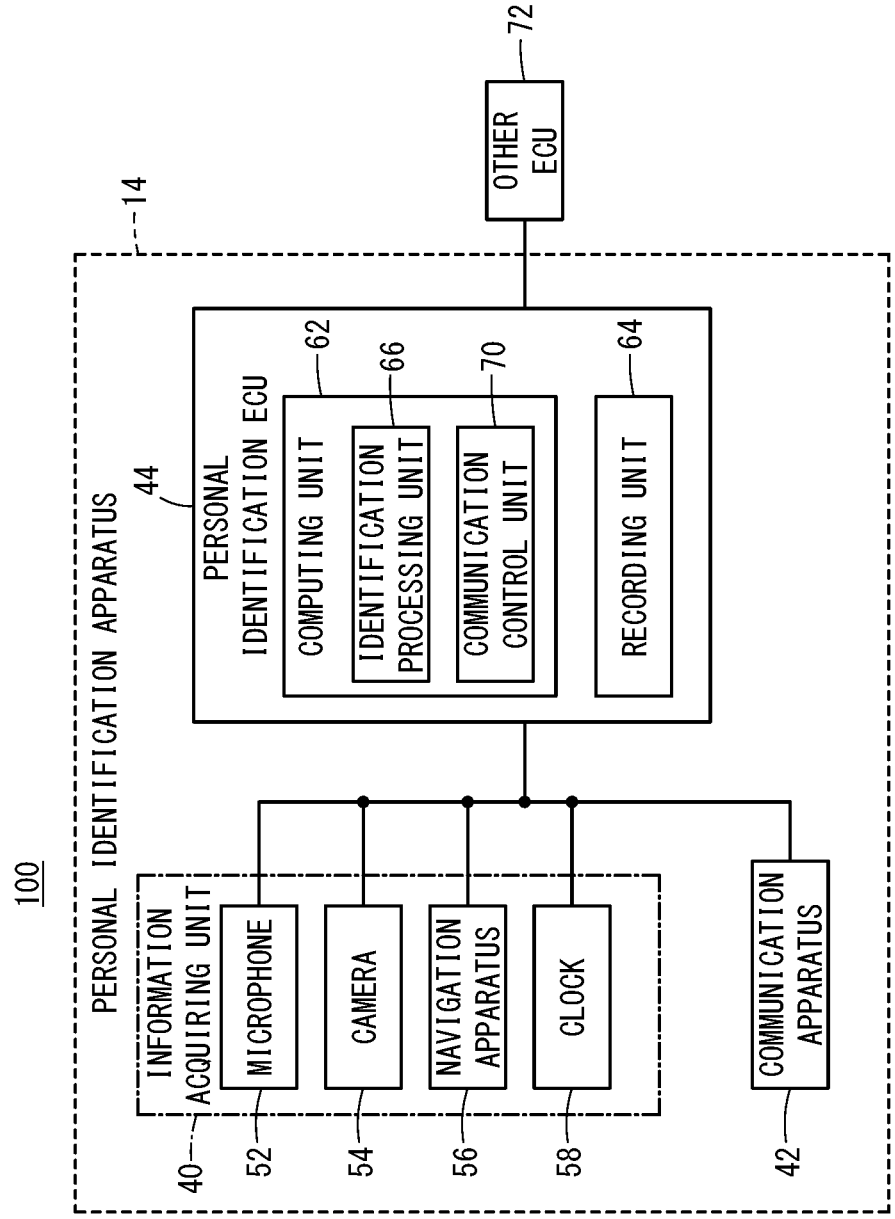
FIG. 4 is a configurational diagram of a vehicle including the personal identification apparatus.

As shown in FIG. 4, the vehicle 100 includes the personal identification apparatus 14 and another ECU 72 that controls each operation using identification results of the personal identification apparatus 14. The personal identification apparatus 14 includes an information acquiring unit 40, a communication apparatus 42, and a personal identification ECU 44.

The information acquiring unit 40 is formed by one or more apparatuses that acquire identification information for identifying a person in the vehicle. The information acquiring unit 40 of the present embodiment includes a microphone 52, a camera 54, a navigation apparatus 56, and a clock 58. The microphone 52 is disposed for each of the seats. The microphone 52 gathers sound near a corresponding seat and outputs audio information to the personal identification ECU 44. The camera 54 captures images of the inside of the vehicle and outputs image information to the personal identification ECU 44. The navigation apparatus 56 outputs information concerning the current position of the vehicle 100 (referred to below as current position information) and information concerning a destination input by a person in the vehicle using a switch or the like (referred to below as destination information) to the personal identification ECU 44. The clock 58 outputs information concerning the most current date and time (referred to below as time information) to the personal identification ECU 44. The information acquiring unit 40 may also include other apparatuses.

The communication apparatus 42 includes a communication circuit, an antenna, and the like, performs data communication with the server 12 via the communication line 18 shown in FIG. 1, and performs data communication with the personal identification ECU 44 via a communication line in the personal identification apparatus 14.

The personal identification ECU 44 is an electronic control unit (ECU) that includes a computing unit 62, a recording unit 64, an input/output interface (not shown in the drawings), and the like. The computing unit 62 includes a processor that has a CPU and the like, and realizes various functions by having the processor perform programs recorded in the recording unit 64. In the present embodiment, the computing unit 62 functions as an identification processing unit 66 and a communication control unit 70. The recording unit 64 includes a storage apparatus such as a ROM and a RAM.

The other ECU 72 performs control corresponding to a person inside the vehicle. The other ECU 72 is an information providing ECU that provides information such as video and audio to a person inside the vehicle, for example. The information providing ECU selects information suitable for each person, based on identification results of the personal identification apparatus 14. The selected information is provided to a person inside the vehicle via a display apparatus and an audio apparatus (not shown in the drawings).

[3. Operation of the Personal Identification Apparatus 14]

The operation of the personal identification apparatus 14 is described using FIGS. 5 and 6. The processes shown in FIGS. 5 and 6 are performed at arbitrary timings. For example, these processes are performed at a first timing at which the ignition switch or start switch is manipulated, a second timing at which the vehicle 100 starts travelling, a third timing that is a prescribed time after the first timing or second timing, or the like.

[3.1. Main Process]

The main process is described using FIG. 5. At step S1, the communication control unit 70 downloads the personal data 26 registered in the personal information DB 22 of the server 12 via the communication apparatus 42 and the feature data 32 registered in the feature information DB 24. The personal data 26 and the feature data 32 are recorded in the recording unit 64.

At step S2, the information acquiring unit 40 acquires the information (including various types of identification information) for identifying the people inside the vehicle. The microphone 52 gathers the sound from a corresponding seat, and outputs audio information to the personal identification ECU 44. The audio information includes outgoing name calling information and incoming name calling information, which are described further below. In order to acquire a sufficient amount of audio information, the sound gathering by the microphone 52 is preferably performed for at least a prescribed time. The camera 54 captures images of the inside of the vehicle, and outputs image information to the personal identification ECU 44. The image information includes action information indicating the action of each person. The navigation apparatus 56 identifies the current location and a destination set at this time, and outputs current location information and destination information to the personal identification ECU 44. The clock 58 identifies the current timing or time span (including date and time), and outputs time information to the personal identification ECU 44.

At step S3, the identification processing unit 66 recognizes the presence of each person and identifies each recognized person, based on the various pieces of acquired information. The identification process performed at step S3 is referred to as a first identification process. As an example, if image information is acquired by the camera 54, the identification processing unit 66 performs a widely known image recognition process using the image information, to recognize the presence of the people, i.e. the number of people and the seating position of each person. Furthermore, the identification processing unit 66 cross-references the image information with the iris information or face image information included in the biometric information 28 of the recording unit 64 to identify each person. As an another example, if the audio information is acquired, the identification processing unit 66 recognizes that a person is sitting in the seat corresponding to the microphone 52 that was able to gather this sound. Furthermore, the identification processing unit 66 cross-references the audio information with the voice imprint information included in the biometric information 28 of the recording unit 64 to identify each person.

At step S4, the identification processing unit 66 judges whether there is a person who could not be identified by the first identification process. If there is a person who could not be identified (step S4: Yes), the process moves to step S5. On the other hand, if there are no people who could not be identified, i.e. if the identification processing unit 66 was able to identify all of the people inside the vehicle (step S4: NO), the series of processes shown in FIG. 5 is ended.

When the process moves from step S4 to step S5, the identification processing unit 66 judges whether there is a person that the identification processing unit 66 was able to identify. Here, a person who could be identified is also referred to as a first person, and a person who could not be identified is also referred to as another person. If there is a person who could be identified (first person) (step S5: YES), the process moves to step S6. On the other hand, if there are no people that could be identified, i.e. if all of the people inside the vehicle were unable to be identified by the identification processing unit 66 (step S5: NO), the series of processes shown in FIG. 5 is ended.

When the process moves from step S5 to step S6, the identification processing unit 66 performs a second identification process that is shown in FIG. 6. When the second identification process ends, the series of processes shown in FIG. 5 is ended. In the second identification process, if the feature data 32 has been updated, the communication control unit 70 uploads the updated feature data 32 to the server 12.

[3.2. Second Identification Process]

The second identification process is performed using FIG. 6. In the following description, a situation is imagined in which the people A, B, and C shown in FIG. 2 are riding in the vehicle 100, and only the person A is identified in step S3 shown in FIG. 5.

At step S11, the identification processing unit 66 searches for feature data 32 linked to the identification information (ID number and the like) of the first person identified at step S3, within the data group recorded in the recording unit 64. Here, as shown in FIG. 3, a search is made for the feature data 32 of the person B or the person C who is the second person linked to the person A who is the first person. The feature data 32 may be recorded in the recording unit 64 by being downloaded at step S11, without being downloaded at step S1 described above. In this case, only the feature data 32 linked to the identification information (ID number and the like) of the first person identified in step S3 above may be downloaded from the feature information DB 24.

At step S12, the identification processing unit 66 judges whether feature data 32 linked to the identification information of the first person is present in the recording unit 64. Here, a judgment is made as to whether there is feature data 32 of the person B or the person C linked to the personal information of the person A. If there is such feature data 32 (step S12: YES), the process moves to step S13. On the other hand, if there is no such feature data 32 (step S12: NO), the process moves to step S20.

When the process moves from step S12 to step S13, the identification processing unit 66 judges whether it was possible to acquire the incoming name calling information from the audio information. The outgoing name calling information is the name by which person A calls person B or person C. If the outgoing name calling information could be acquired (step S13: YES), the process moves to step S14. On the other hand, if the outgoing name calling information could not be acquired (step S13: NO), the process moves to step S16.

When the process moves from step S13 to step S14, the identification processing unit 66 cross-references the outgoing name calling information acquired from the audio information with the recorded outgoing name calling information 34c of the feature data 32.

At step S15, the identification processing unit 66 judges whether there is feature data 32 that includes recorded outgoing name calling information 34c matching the outgoing name calling information. The term "matching" in the present embodiment includes not only complete matching, but also matching to a prescribed degree. An example of matching to a prescribed degree is a case where only one sound (one letter) in the name differs, but the vowel sounds are the same and the consonant sounds are similar (such as voiced plosives and unvoiced plosives). If there is such feature data 32 (step S15: YES), the process moves to step S18. On the other hand, if there is no such feature data 32 (step S15: NO), the process moves to step S16.

When the process moves from step S15 to step S16, the identification processing unit 66 cross-references identification information other than the outgoing name calling information, among each piece of acquired information, with the feature information 34 other than the recorded outgoing name calling information 34c in the feature data 32. For example, the identification processing unit 66 cross-references the incoming name calling information that was able to be acquired from the audio information with the recorded incoming name calling information 34d in the feature data 32. The incoming name calling information is the name that the people B and C call the person A. Furthermore, the identification processing unit 66 cross-references the time information that was able to be acquired by the clock 58 with the recorded time information 34a in the feature data 32. The identification processing unit 66 cross-references the current location information or destination information that was able to be acquired by the navigation apparatus 56 with the recorded location information 34b in the feature data 32. The identification processing unit 66 cross-references the action information of the other people that was able to be acquired from the image information with the recorded action information 34e of the feature data 32.

At step S17, the identification processing unit 66 judges whether there is feature data 32 including feature information 34 (at least one of 34a, 34b, 34d, and 34e) that matches the identification information. If there is such feature data 32 (step S17: YES), the process moves to step S18. On the other hand, if there is no such feature data 32 (step S17: NO), the process moves to step S20.

When the process moves from step S15 or step S17 to step S18, the identification processing unit 66 identifies the other person as a second person registered in the feature data 32. For example, in a case where the name that the first person (person A) calls the other person is "BB", in a case where the date and time is "3:00 p.m. on Saturday", the current location or destination is "supermarket X", the name that the other person calls the first person (person A) is "AA", or the action of the other person is "touching their hair", the identification processing unit 66 identifies the other person as the person B, based on the feature data 32 shown in FIG. 3.

At step S19, if a portion of the identification information acquired by the information acquiring unit 40 differs from the feature information 34 included in the feature data 32, the identification processing unit 66 adds this acquired differing identification information to the feature data 32 as new feature information 34. As an example, a case is imagined in which the person B is identified as the second person but the destination is a restaurant instead of the supermarket shown in FIG. 3. In this case, as shown in FIG. 7, the restaurant is added to the recorded location information 34b of the person B.

When the process moves from step S17 to step S20, the identification processing unit 66 judges that the other person is a person who is not recorded in the recording unit 64. At this time, as shown in FIG. 8, the identification processing unit 66 newly creates the feature data 32a and registers each piece of identification information acquired this time to the feature information 34. At this time, the information indicating the name (or ID number) of the second person and the relationship that the second person has to the first person, may be left blank due to being unknown, or may be input by a person inside the vehicle via an input apparatus (not shown in the drawings).

[4. Modifications]

[4.1. First Modification]

In a case where the first person is a child and the other person together with the first person is not identified, a person related to the child, who is the first person, may be contacted. For example, a case is imagined in which the person C shown in FIG. 2 is identified as the first person and the other person is not identified by the first identification process and also not identified by the second identification process. In this case, at step S3 shown in FIG. 5, the identification processing unit 66 judges whether the person C is an adult or a child by calculating the age of the person C based on the date of birth information included in the personal data 26 of the person C and comparing this this age to a prescribed age threshold value. If the identification processing unit 66 cannot identify another person other than the person C (FIG. 6, step S17: NO), the communication control unit 70 transmits notification information to a contact address of the communication terminal 16 included in the personal data 26 of the person C, in order to notify the people A and B who are related to (parents of) the person C.

[4.2. Second Modification]

As an example, it is imagined that there are three people (a married couple and a child) such as shown in FIG. 2. The person A calls the person B who is the wife "BB", and the person A is called "AA" by the person B. However, there are cases where these names differ depending on whether these two people are together with the person C, who is the child. For example, it is possible that the people A and B call each other the names shown above when the person C is not present, but call each other different names (e.g. "mom", "dad", or the like) when the person C is present.

Figure 9:
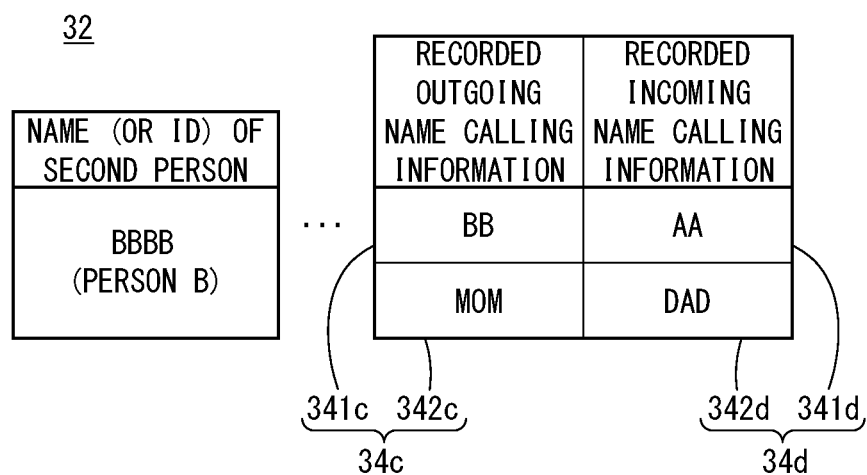
FIG. 9 is a configurational diagram of the recorded outgoing name calling information and the recorded incoming name calling information of a modification.

In such a case, as shown in FIG. 9, the recorded outgoing name calling information 34c may include first recorded outgoing name calling information 341c and second recorded outgoing name calling information 342c. In the example shown in FIG. 9, the first recorded outgoing name calling information 341c and the second recorded outgoing name calling information 342c are included in the recorded outgoing name calling information 34c of the person B with respect to the person A. In the example shown in FIG. 9, the first recorded outgoing name calling information 341c is recorded as the name that the person A calls the person B when the people A and B are alone together. Furthermore, the second recorded outgoing name calling information 342c is recorded as the name that the person A calls the person B when the people A and B are together with the person C. The recorded outgoing name calling information 34c may include one or more pieces of the second recorded outgoing name calling information 342c. For example, in addition to the example described above, the recorded outgoing name calling information 34c may further include second recorded outgoing name calling information 342c recorded as the name that the person A calls the person B when the people A and B are together with a person D.

Furthermore, as shown in FIG. 9, the recorded incoming name calling information 34d may include first recorded incoming name calling information 341d and second recorded incoming name calling information 342d. In the example shown in FIG. 9, the first recorded incoming name calling information 341d and the second recorded incoming name calling information 342d are included in the recorded incoming name calling information 34d of the person B with respect to the person A. In the example shown in FIG. 9, the first recorded incoming name calling information 341*d* is recorded as the name that the person A is called by the person B when the people A and B are alone together. Furthermore, the second recorded incoming name calling information 342*d* is recorded as the name that the person A is called by the person B when the people A and B are together with the person C. The recorded incoming name calling information 34*d* may include one or more pieces of the second recorded incoming name calling information 342*d*. For example, in addition to the example described above, the recorded incoming name calling information 34*d* may further include second recorded incoming name calling information 342*d* recorded as the name that the person A is called by the person B when the people A and B are together with the person D.

In this modification, at step S14, if the identification processing unit 66 recognizes the presence of one person who cannot be identified other than the first person (person A) who was able to be identified, the identification processing unit 66 judges whether there is feature data 32 including the first recorded outgoing name calling information 341*c* that matches the outgoing name calling information. Furthermore, if the identification processing unit 66 recognizes the presence of two people who cannot be identified, e.g. the second person (person B) and the third person (person C), other than the first person (person A) who was able to be identified, the identification processing unit 66 judges whether there is feature data 32 including the second recorded outgoing name calling information 342*c* that matches the outgoing name calling information.

In the above process, if the third person (person C or person D) other than the first person (person A) was able to be identified, the identification processing unit 66 may use the second recorded outgoing name calling information 342*c* corresponding to this third person.

Furthermore, in this modification, at step S16, if the identification processing unit 66 recognizes the presence of one person who cannot be identified other than the first person (person A) who was able to be identified, the identification processing unit 66 judges whether there is feature data 32 including the first recorded incoming name calling information 341*d* that matches the incoming name calling information. Furthermore, if the identification processing unit 66 recognizes the presence of two people who cannot be identified, e.g. the second person (person B) and the third person (person C), other than the first person (person A) who was able to be identified, the identification processing unit 66 judges whether there is feature data 32 including the second recorded incoming name calling information 342*d* that matches the incoming name calling information.

In the above process, if the third person (person C or D) other than the first person (person A) was able to be identified, the identification processing unit 66 may use the second recorded incoming name calling information 342*d* corresponding to this third person.

[4.3. Other Modifications]

In the embodiment described above, the personal data 26 and the feature data 32 are downloaded from the personal information DB 22 and the feature information DB 24 of the server 12. Instead, the personal data 26 and the feature data 32 may be recorded in advance in the recording unit 64.

In the embodiment described above, at step S3 shown in FIG. 5, the first identification process is performed on each person recognized by the identification processing unit 66. Instead, the second identification process shown in FIG. 6 may be performed as soon as the first person is identified, without performing the first identification process on people other than this identified person.

In the embodiment described above, the personal identification apparatus 14 is provided in the vehicle 100. Instead, the personal identification apparatus 14 may be provided in another moving body such as a train car, boat, or airplane, and may identify people that are together inside the moving body. Furthermore, the personal identification apparatus 14 may be provided in a personal computer or mobile terminal, and may identify people together in the surrounding area.

[5. Technical Concepts Obtained from the Embodiment]

The technical concepts that can be understood from the embodiment and modifications described above are recorded below.

The present invention is a personal identification apparatus 14 that identifies a first person (person A) and then identifies a person other than the first person, comprising the recording unit 64 that records in advance the feature information 34 relating to the activity of at least one of the first person and a second person (person B or C) when the first person and the second person are together; the information acquiring unit 40 that acquires identification information for identifying the other person; and the identification processing unit 66 that identifies the other person as the second person, based on the matching between the identification information and the feature information 34.

According to the above configuration, it is possible to identify the other person, who is together with the first person, as the second person, by identifying the first person. Furthermore, since it is possible to identify the other person using a simple method if the first person can be identified, the load of the identification process is reduced.

In the present invention, the identification processing unit 66 may identify the other person without relying on the feature information 34 and, if the other person cannot be identified without relying on the feature information 34, may identify the other person based on the matching between the identification information and the feature information 34.

With the configuration described above, even if the other person who is not the first person cannot be identified with a normal identification process (image recognition process or the like), it is possible to identify this other person as the second person.

In the present invention, the information acquiring unit 40 (clock 58) may acquire time information that is a current timing or time span, as the identification information; the feature information 34 may include recorded time information 34*a* recorded as a timing or time span at which the first person (person A) performs the activity together with the second person (person B or C); and the identification processing unit 66 may identify the other person as the second person based on matching between time information and the recorded time information 34*a*.

In the present invention, the information acquiring unit 40 (navigation apparatus 56) may acquire destination information that is a destination of the current movement of the first person (person A), as the identification information; the feature information 34 may include the recorded location information 34*b* recorded as a location where the first person performs the activity together with the second person (person B or C); and the identification processing unit 66 may identify the other person as the second person based on the matching between the destination information and the recorded location information 34*b*.

In the present invention, the information acquiring unit 40 (navigation apparatus 56) may acquire current location information that is a current location of the first person (person A), as the identification information; the feature information 34 may include the recorded location information 34b recorded as a location where the first person performs the activity together with the second person (person B or C); and the identification processing unit 66 may identify the other person as the second person based on the matching between the current location information and the recorded location information 34b.

In the present embodiment, the information acquiring unit 40 (microphone 52) may acquire the outgoing name calling information that is the name that the first person (person A) calls a conversation partner of the first person, as the identification information; the feature information 34 may include the recorded outgoing name calling information 34c recorded as the name that the first person calls the second person (person B or C); and the identification processing unit 66 may identify the other person as the second person based on the matching between the outgoing name calling information and the recorded outgoing name calling information 34c.

With the configuration described above, the other person is identified as the second person based on the outgoing name calling information that is unique information in the relationship between the first person and the other person, and therefore the accuracy of the identification is further improved.

In the present invention, the feature information 34 may include, as the recorded outgoing name calling information 34c, the first recorded outgoing name calling information 341c recorded as the name that the first person (person A) calls the second person (person B) when the first person and the second person are alone together and the second recorded outgoing name calling information 342c recorded as the name that the first person calls the second person when the first person and the second person are together with the third person (person C); and the identification processing unit 66 may identify the other person as the second person based on the matching between the outgoing name calling information and the second recorded outgoing name calling information 342c, if the first person and the second person are together with the third person.

With the configuration described above, it is possible to more accurately identify the second person, and the identification accuracy is further improved.

In the present embodiment, the information acquiring unit 40 (microphone 52) may acquire the incoming name calling information that is the name that the first person (person A) is called by a conversation partner of the first person, as the identification information; the feature information 34 may include the recorded incoming name calling information 34d recorded as the name that the first person is called by the second person (person B or C); and the identification processing unit 66 may identify the other person as the second person based on the matching between the incoming name calling information and the recorded incoming name calling information 34d.

With the configuration described above, the other person is identified as the second person based on the incoming name calling information that is unique information in the relationship between the first person and the other person, and therefore the accuracy of the identification is further improved.

In the present invention, the feature information 34 may include, as the recorded incoming name calling information 34d, the first recorded incoming name calling information 341d recorded as the name that the first person (person A) is called by the second person (person B) when the first person and the second person are alone together and the second recorded incoming name calling information 342d recorded as the name that the first person is called by the second person when the first person and the second person are together with the third person (person C); and the identification processing unit 66 may identify the other person as the second person based on the matching between the incoming name calling information and the second recorded incoming name calling information 342d, if the first person and the second person are together with the third person.

With the configuration described above, it is possible to more accurately identify the second person, and the identification accuracy is further improved.

In the present embodiment, the information acquiring unit 40 (camera 54) may acquire the action information indicating the action of the other person, as the identification information; the feature information may include the recorded action information 34e recorded as the action of the second person (person B or C) when performing the activity together with the first person (person A); and the identification processing unit 66 may identify the other person as the second person based on the matching between the action information and the recorded action information 34e.

With the configuration described above, the other person is identified as the second person based on the action information that is information indicating a feature of the other person, and therefore the identification accuracy is improved.

In the present embodiment, the information acquiring unit 40 may be capable of acquire the outgoing name calling information that is the name that the first person (person A) calls the conversation partner of the first person, as the identification information; and the identification processing unit 66 may identify the other person as the second person (person B or C) based on the identification information other than the outgoing name calling information acquired by the information acquiring unit 40, if the outgoing name calling information cannot be acquired by the information acquiring unit 40 (see step S13: NO, step S16, step S17: YES, and step S18 in FIG. 6).

According to the configuration described above, even if outgoing name calling information effective for identifying the other person cannot be acquired, the other person is identified as the second person based on other pieces of identification information, and therefore it is possible to increase the possibility of identification.

In the present embodiment, the information acquiring unit 40 may be capable of acquiring the outgoing name calling information that is the name that the first person (person A) calls the conversation partner of the first person, as the identification information; the feature information 34 may include the recorded outgoing name calling information 34c that is recorded as the same that the first person calls the second person (person B or C); and the identification processing unit 66 may identify the other person as the second person without relying on the matching between the identification information other than the outgoing name calling information and the feature information 34 other than the recorded outgoing name calling information 34c, if the outgoing name calling information and the recorded outgoing name calling information 34c match (see step S15: YES and step S18 of FIG. 6).

According to the configuration described above, use of the outgoing name calling information that is effective for identifying the other person is prioritized, and therefore the reliability of the identification is improved.

In the present embodiment, the identification processing unit 66 may record the identification information other than the outgoing name calling information acquired by the information acquiring unit 40 in the recording unit 64, as the feature information 34 other than the recorded outgoing name calling information 34c, if the outgoing name calling information and the recorded outgoing name calling information 34c match (see step S19 of FIG. 6).

With the configuration described above, the feature information 34 is recorded at any time, and therefore the accuracy and reliability of the following identifications are improved.

In the present invention, the identification processing unit 66 may judge the other person to be a person who is not recorded in the recording unit 64, if the feature information 34 and the identification do not match.

In the present invention, the information acquiring unit 40 may acquire at least one of the time information that is the current timing or time span, the destination information that is the destination of current movement of the first person (person A), the current location information that is the current location of the first person, the outgoing name calling information that is the name that the fires person calls the conversation partner of the first person, and the incoming name calling information that is the name that the first person is called by the conversation partner of the first person, as the identification information; and the identification processing unit 66 may newly record the identification information acquired by the information acquiring unit 40 in the recording unit 64 (step S20 in FIG. 6).

According to the configuration described above, since the feature information 34 is recorded at any time, the accuracy and reliability of the following identifications are improved.

The present invention may further comprise a communication control unit 70 that notifies a specified external communication terminal 16 if the first person (person C) is a child.

According to the configuration described above, if a child is together with a person who is not a person (e.g. a parent) related to the child, it is possible to notify a person related to the child, thereby providing the person related to the child with a sense of safety.

The present invention is also a personal identification method for identifying a first person (person A) and then identifying a person other than the first person, comprising recording in advance, in the recording unit 64, the feature information 34 relating to the activity of at least one of the first person and a second person (person B or C) when the first person and the second person are together; acquiring, with the information acquiring unit 40, identification information for identifying the other person; and identifying, with the identification processing unit 66, the other person as the second person, based on the matching between the identification information and the feature information 34.

The personal identification apparatus and the personal identification method according to the present invention are not limited to the above described embodiments, and it is apparent that various alterations can be made without deviating from the scope of the present invention.

What is claimed is:

1. A personal identification apparatus that identifies a first person and then identifies another person other than the first person, comprising:
   a recording unit configured to record identification information of the first person and biometric information of the first person linked to each other, and record feature information concerning an action taken by at least one of the first person and a second person, when the first person and the second person spent time together, the feature information being linked to the identification information of the first person and identification information of the second person;
   an information acquiring unit configured to acquire the biometric information of the first person and behavior information of the other person, the behavior information of the other person being different from biometric information of the other person; and
   an identification processing unit configured to identify the first person based on the biometric information of the first person acquired by the information acquiring unit, search for the feature information linked to the first person in the recording unit, and identify the other person as the second person, based on matching between the behavior information acquired by the information acquiring unit and the feature information retrieved from the recording unit;
   wherein the action taken by the at least one of the first person and the second person, when the first person and the second person spent time together, is an action that occurred outside of a host vehicle of the personal identification apparatus.

2. The personal identification apparatus according to claim 1, wherein
   the identification processing unit performs a first identification processing, which identifies the other person from the biometric information of the other person, and performs a second identification processing, which identifies the other person based on the matching between the behavior information acquired by the information acquiring unit and the feature information retrieved from the recording unit if the first identification fails.

3. The personal identification apparatus according to claim 1, wherein
   the information acquiring unit acquires time information that is a current timing or time span, as the behavior information,
   the feature information includes recorded time information recorded as a timing or time span at or during which the first person spent time together with the second person, and
   the identification processing unit identifies the other person as the second person based on matching between the time information and the recorded time information.

4. The personal identification apparatus according to claim 1, wherein
   the information acquiring unit acquires destination information that is a destination of current movement of the first person, as the behavior information,
   the feature information includes recorded location information recorded as a location where the first person spent time together with the second person, and
   the identification processing unit identifies the other person as the second person based on matching between the destination information and the recorded location information.

5. The personal identification apparatus according to claim 1, wherein
   the information acquiring unit acquires current location information that is a current location of the first person, as the behavior information,
   the feature information includes recorded location information recorded as a location where the first person spent time together with the second person, and the identification processing unit identifies the other person as the second person based on matching between the current location information and the recorded location information.

6. The personal identification apparatus according to claim 1, wherein
the information acquiring unit acquires outgoing name calling information that is a name that the first person calls a conversation partner of the first person, as the behavior information,
the feature information includes recorded outgoing name calling information recorded as a name that the first person calls the second person, and
the identification processing unit identifies the other person as the second person based on matching between the outgoing name calling information and the recorded outgoing name calling information.

7. The personal identification apparatus according to claim 6, wherein
the feature information includes, as the recorded outgoing name calling information, first recorded outgoing name calling information recorded as a name that the first person calls the second person when the first person and the second person are alone together and second recorded outgoing name calling information recorded as a name that the first person calls the second person when the first person and the second person are together with a third person, and
the identification processing unit identifies the other person as the second person based on matching between the outgoing name calling information and the second recorded outgoing name calling information, if the first person and the second person are together with the third person.

8. The personal identification apparatus according to claim 1, wherein
the information acquiring unit acquires incoming name calling information that is a name that the first person is called by a conversation partner of the first person, as the behavior information,
the feature information includes recorded incoming name calling information recorded as a name that the first person is called by the second person, and
the identification processing unit identifies the other person as the second person based on matching between the incoming name calling information and the recorded incoming name calling information.

9. The personal identification apparatus according to claim 8, wherein
the feature information includes, as the recorded incoming name calling information, first recorded incoming name calling information recorded as a name that the first person is called by the second person when the first person and the second person are alone together and second recorded incoming name calling information recorded as a name that the first person is called by the second person when the first person and the second person are together with a third person, and
the identification processing unit identifies the other person as the second person based on matching between the incoming name calling information and the second recorded incoming name calling information, if the first person and the second person are together with the third person.

10. The personal identification apparatus according to claim 1, wherein
the information acquiring unit acquires action information indicating action of the other person, as the behavior information,
the feature information includes recorded action information recorded as action of the second person when spending time together with the first person, and
the identification processing unit identifies the other person as the second person based on matching between the action information and the recorded action information.

11. The personal identification apparatus according to claim 3, wherein
the information acquiring unit is configured to acquire outgoing name calling information that is a name that the first person calls a conversation partner of the first person, as the behavior information, and
the identification processing unit identifies the other person as the second person based on the behavior information other than the outgoing name calling information acquired by the information acquiring unit, if the outgoing name calling information cannot be obtained by the information acquiring unit.

12. The personal identification apparatus according to claim 3, wherein
the information acquiring unit is configured to acquire outgoing name calling information that is a name that the first person calls a conversation partner of the first person, as the behavior information, and
the feature information includes recorded outgoing name calling information recorded as a name that the first person calls the second person, and
the identification processing unit identifies the other person as the second person without relying on matching between the behavior information other than the outgoing name calling information and the feature information other than the recorded outgoing name calling information, if the outgoing name calling information and the recorded outgoing name calling information match.

13. The personal identification apparatus according to claim 12, wherein
the identification processing unit records the behavior information other than the outgoing name calling information acquired by the information acquiring unit in the recording unit, as the feature information other than the recorded name calling information, if the outgoing name calling information and the recorded outgoing name calling information match.

14. The personal identification apparatus according to claim 1, wherein
the identification processing unit judges the other person to be a person who is not recorded in the recording unit, if the feature information and the behavior information do not match.

15. The personal identification apparatus according to claim 14, wherein
the information acquiring unit acquires at least one of time information that is a current timing or time span, destination information that is a destination of current movement of the first person, current location information that is a current location of the first person, outgoing name calling information that is a name that the fires person calls a conversation partner of the first person, and incoming name calling information that is a name that the first person is called by the conversation partner of the first person, as the behavior information, and the identification processing unit newly records the behavior information acquired by the information acquiring unit in the recording unit.

16. The personal identification apparatus according to claim 14, further comprising:

a communication control unit that notifies a specified external communication terminal if the first person is a child.

17. A personal identification method for identifying a first person and then identifying another person other than the first person, comprising:

Recording, in a recording unit, identification information of the first person and biometric information of the first person linked to each other;

recording, in the recording unit, feature information concerning an action taken by at least one of the first person and a second person, when the first person and the second person spent time together, the feature information being linked to the identification information of the first person and identification information of the second person;

acquiring, with an information acquiring unit, the biometric information of the first person and behavior information of the other person, the behavior information of the other person being different from biometric information of the other person;

identifying, with an identification processing unit, the first person based on the biometric information of the first person acquired by the information acquiring unit, search for the feature information linked to the first person in the recording unit; and identifying, with the identification processing unit, the other person as the second person, based on matching between the behavior information acquired by the information acquiring unit and the feature information retrieved from the recording unit;

wherein the action taken by the at least one of the first person and the second person, when the first person and the second person spent time together, is an action that occurred outside of a host vehicle of the personal identification apparatus.

* * * * *